US005873999A

United States Patent [19]
Gaiser

[11] Patent Number: 5,873,999
[45] Date of Patent: Feb. 23, 1999

[54] SIEVING AND FILTRATION SCREEN

[75] Inventor: Richard M. Gaiser, Pendleton, N.Y.

[73] Assignee: Sefar America Inc., Depew, N.Y.

[21] Appl. No.: 920,463

[22] Filed: Aug. 29, 1997

[51] Int. Cl.$^6$ .................................................. B01D 29/05
[52] U.S. Cl. .................. 210/488; 210/494.2; 210/494.3; 210/495; 210/497.01; 210/497.2; 55/511; 55/524; 55/525
[58] Field of Search ................................... 210/483, 488, 210/494.3, 495, 497.2, 497.01, 499, 494.2; 55/511, 524, 525

[56] References Cited

U.S. PATENT DOCUMENTS

| | | | |
|---|---|---|---|
| 2,316,526 | 4/1943 | McDonald | 55/511 |
| 3,300,952 | 1/1967 | Cuta | 55/511 |
| 3,310,098 | 3/1967 | Hardison | 55/505 |
| 3,322,557 | 5/1967 | Pall . | |
| 3,332,557 | 7/1967 | Pall | 210/495 |
| 3,341,013 | 9/1967 | Moulton | 55/502 |
| 3,382,985 | 5/1968 | Muehl . | |
| 4,422,861 | 12/1983 | Dusza | 55/502 |
| 4,497,709 | 2/1985 | Nicholson | 210/489 |
| 4,601,820 | 7/1986 | Leason | 210/94 |
| 4,740,413 | 4/1988 | Wildner | 156/290 |
| 4,961,849 | 10/1990 | Hull et al. | 55/495 |
| 4,986,904 | 1/1991 | Bugar et al. | 210/94 |
| 5,102,436 | 4/1992 | Grabowski | 55/487 |
| 5,169,524 | 12/1992 | Meiritz et al. | 55/497 |
| 5,599,449 | 2/1997 | Gnamm et al. | 55/DIG. 31 |
| 5,651,888 | 7/1997 | Shimuzu et al. | 210/321.64 |
| 5,690,826 | 11/1997 | Cravello | 210/499 |

FOREIGN PATENT DOCUMENTS

| | | |
|---|---|---|
| 482622 | 4/1938 | United Kingdom . |
| 1045309 | 10/1966 | United Kingdom . |

*Primary Examiner*—David A. Reifsnyder
*Attorney, Agent, or Firm*—Howard M. Ellis; Marianne Fuierer

[57] ABSTRACT

A sieving screen or filtration screen, and processes for producing the same, featuring the use of a flexible, chemical resistant, intermittent, polymeric coating as an edging material and/or for providing indicia for identification purposes to show, for example, the source of the product, producer's or customer's logos, trade names, part numbers, indications and precautions for use, and any other forms of instruction and/or information, as well as providing an intermittent or discontinuous coating to allow for electrical grounding with a conventional filter clamp or the like. Screen printing is one preferred method for applying the polymeric matter to the sieve or filter screen.

15 Claims, 2 Drawing Sheets

SIEVING AND FILTRATION SCREEN

TECHNICAL FIELD

This invention relates to a new and improved sieving screen or filtration screen and, more particularly, screens which feature the use of a flexible, chemical resistant polymeric coating as an edging or other enhancement, such as identification or informative indicia on the screen.

BACKGROUND OF THE INVENTION

Screens which may be used as a sieve screen and/or a filter screen are generally comprised of a plurality of openings or open spaces which may be produced in a variety of known ways such as being in the form of fabric comprised of woven, interlaced or intertwined thread, cord or wire, or may be molded, stamped, needled, etched and the like, for forming a gauze or mesh material which can be used for separating coarse and fine particles from each other, or for removing particulate or viscous matter from fluids, including liquids and/or gases. The current state of the art for such screens usually involves the use of a cloth, or felt, or other form of edging which is typically attached by sewing or stitching such edging to the perimeter of the perforated or mesh portion for providing a friction surface to preclude the screen from slipping out from under a clamping ring or other type of holding attachment. Also, such edging typically provides some degree of finished appearance to the screen and additionally may have a gasketing function. Such a prior art screen is shown in FIGS. 1 and 2 and will hereinafter be further described.

There are a considerable number of problems which are typical of such prior art screens:

(a) Current cloth or felt edging materials absorb liquids. Washing and drying of conventional screens is made difficult because of this tendency for present edgings to absorb liquids.

(b) Conventional sewn-on edgings have gaps or crevices which can trap either particles or liquids, or both. Cleaning of such screens for reuse is difficult and cross-contamination between process batches is a distinct possibility.

(c) Conventional sewn-on edgings can be, and usually are, costly because of waste of the edging material. The "donut" of cloth used for the typical circular, oval or rectangular edging is often die cut out of a roll of fabric. The unused center portion is usually discarded, thus resulting in a waste factor as high as 60 percent.

(d) Conventional sewn-on edgings require the use of ink markings for identification, such as for specifying indicated uses, precautions, sizes, models, and other forms of information. The ink used for marking may be a source of contamination in certain process applications.

United Kingdom Patent 482,622 discloses a filtration device comprised of a wire gauze or mesh having a pair of peripheral gasket members of india rubber disposed on opposite marginal edges thereof and then vulcanized to form a continuous coating intimately bonded to the wire gauze. There is no teaching of patterned or intermittent indicia nor discontinuous portions for allowing electrical contact for grounding of the screen, nor teaching of providing informative data and the like to the screen area or marginal portions thereof.

U.S. Pat. No. 3,382,985 discloses a filter element in the form of a woven cloth of polypropylene, nylon, Acrilon or polyurethane fiber, fiber glass or cotton with an integral gasket which eliminates gasket grooves. The gasket material may also consist of woven polymeric fibers using a resilient or spongy, e.g., waffle, trilock or honeycomb bonded with an adhesive, e.g., epoxy adhesive, liquid neoprene or latex. The gasket may also be sewn to the filter element with polymeric thread. The gasket material is continuous throughout and the patent does not teach or suggest a discontinuous coated edge portion nor indicia of any kind..

U.S. Pat. No. 3,332,557 discloses a filter element comprising a wire mesh screen and a peripheral or marginal anchoring strip of greater thickness than the wire mesh. The gasket portion is disclosed as being in the form of a molded ring, which may be rubber or the like. As in the above mentioned prior art, there is no teaching or suggestion of a discontinuous polymeric coated edge which would allow for electrical grounding nor for the provision of indicia of any kind.

SUMMARY OF THE INVENTION

The invention is comprised of a novel sieving screen or filtration screen, and processes for producing the same, which features the use of a flexible, chemical resistant, intermittent, polymeric coating as an edging material and/or for providing indicia for identification purposes to show, for example, the source of the product, producer's or customer's logos, trade names, part numbers, indications and precautions for use, and any other forms of instruction and/or information, as well as providing an intermittent or discontinuous coating to allow for electrical grounding with a conventional filter clamp or the like.

Typical end use applications for such screens include, but are not limited to, sieving of dry powders, solid/fluid separation, delumping, screening, dry powders sifting, filtering and the like.

Other objects of the invention, and specific improvements over the prior art will become apparent to persons skilled in this art from a consideration of the following descriptions.

DESCRIPTION OF THE PREFERRED EMBODIMENT

Figure 1:
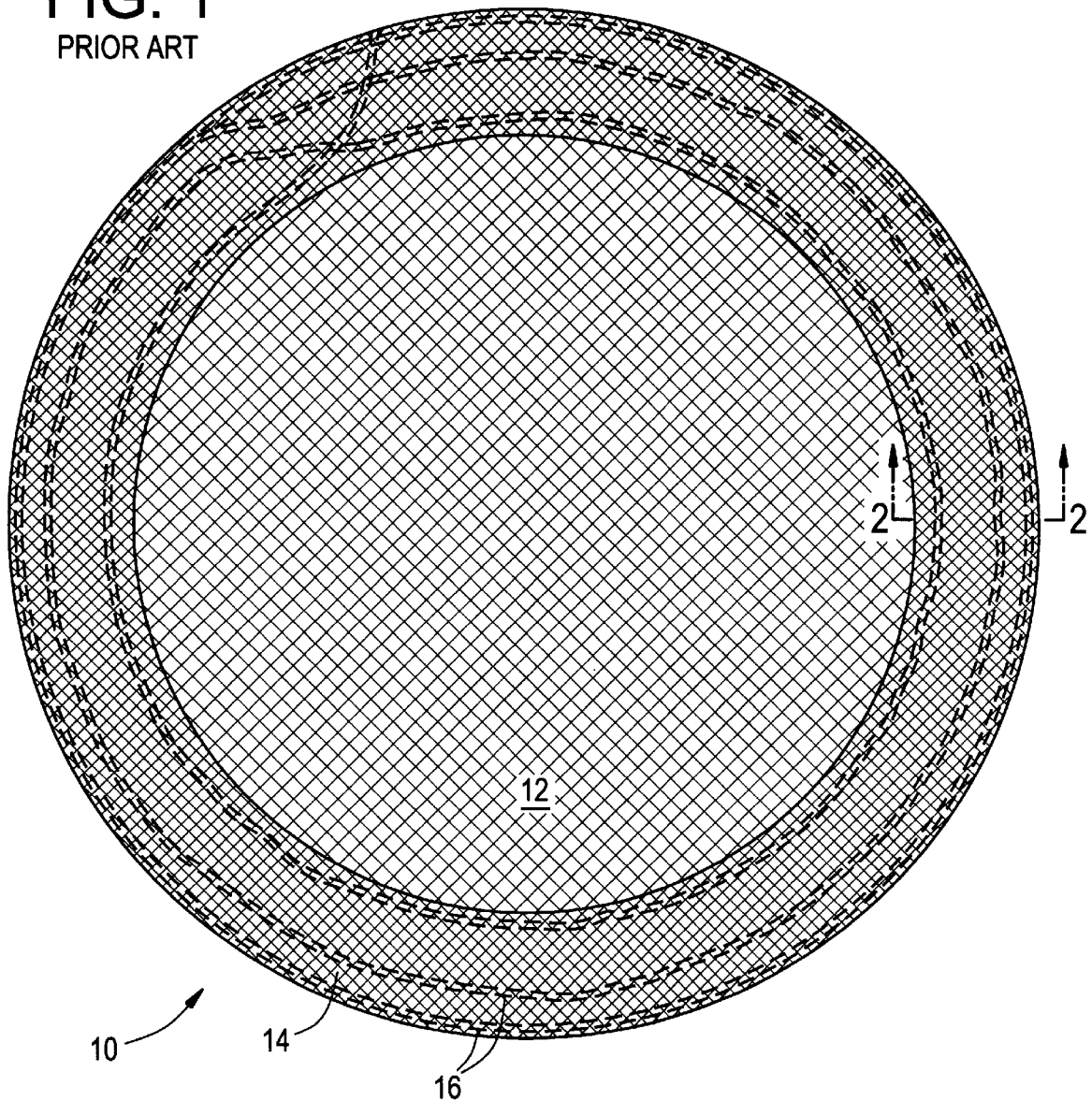
FIG. 1 shows a Prior Art form of sieve or filter screen.
Figure 2:
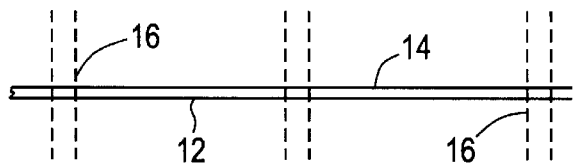
FIG. 2 is a sectional view of the Prior Art taken on line 2—2 of FIG. 1.

One form of prior art sieve or filter screen, generally indicated by the numeral 10, is shown in FIGS. 1 and 2 and includes a central mesh portion 12, a peripheral marginal portion 14 and stitching 16 for sewing and securing the marginal portion 14 to the central portion 12. As described above under the Background of the Invention, the conventional cloth or felt marginal portions, or edgings, create a large assortment of problems, which problems are overcome by the present invention.

Figure 3:
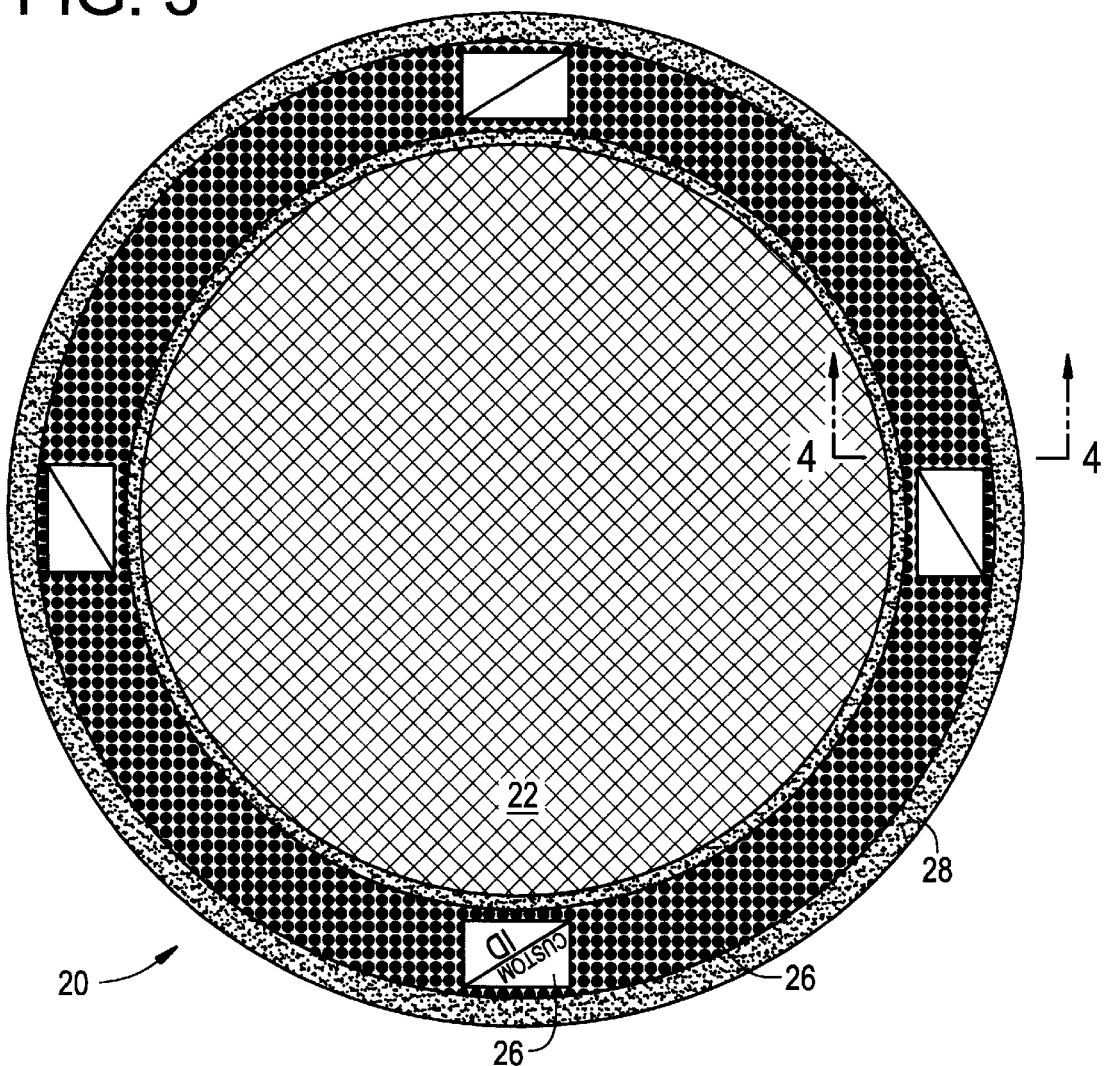
FIG. 3 is a plan view of a sieve or filter screen in accordance with the present invention.
Figure 4:
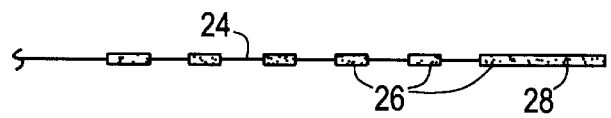
FIG. 4 is a sectional view taken on line 4—4 of FIG. 3.
Figure 5:
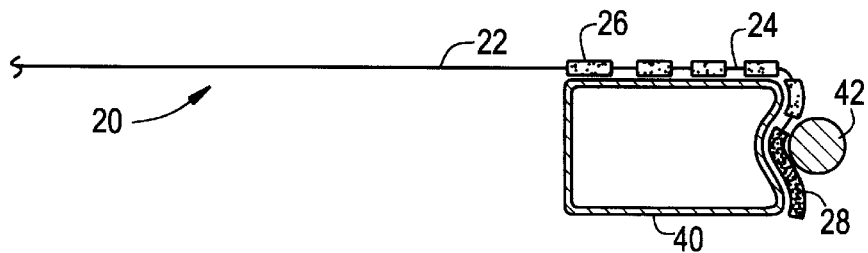
FIG. 5 is a fragmentary sectional view of a sieve or filter in accordance with the present invention showing a marginal portion thereof secured between a pair of clamp elements.

Referring to FIGS. 3, 4 and 5, it will be seen that the invention is comprised of a sieve or filter screen, generally indicated by the numeral 20, which is comprised of a central foraminous, gauze or mesh section 22 which may be produced in any known fashion, such as being in the form of fabric comprised of woven, interlaced or intertwined thread, cord or wire, or the like, or may be molded, stamped, needled, etched, or the like..

The central section 22 is generally surrounded by a peripheral marginal portion 24 which features the use of a flexible, chemical resistant polymeric coating 26 which can be applied in the form of a continuous edging 28 or as a selective enhancement at the marginal edge and/or elsewhere on the screen.

Polymeric coating 26 can be applied to screen 20 using different processes or methodologies including, but not limited to, brushing, rolling, squeegee, spraying, direct screen printing, indirect screen printing, indirect screen printing (heat transfer method), radio frequency sealing or using thermal fusion technology. The presently preferred application method is the use of screen printing in which the polymeric coating 26 is applied, or printed, directly upon mesh section 22 or, alternatively, by first printing the coating 26 onto a suitable transfer paper and then thermally fusing the printed image directly onto mesh section 22.

The present invention allows for coating 26 to be applied to mesh section 22, of screen 20, in a pattern configuration with the pattern addressing some requirement for functionality including, but not limited to one or more of: gasketing, friction surfacing, electrical continuity, cleanability, washability, screen fraying resistance, appearance, identification, abrasion resistance, mechanical reinforcement, and flexibility. A continuous coating pattern, such as is shown at edging 28, provides for enhanced screen fraying resistance. Intermittent coating patterns can effectively, and simultaneously, satisfy numerous performance requirements such as: friction surfacing, marking, identification, coating minimization, screen cloth fraying protection, cleanability, washability, rapid drying and intermittent electrical continuity or chassis earthing where desirable or required.

The various pattern effects shown in FIGS. 3, 4 and 5 can be accomplished by methodologies including, but not limited to, stencil, mechanical printing, Screen printing, articulating spray head or masking. The presently preferred pattern technology is screen printing.

Edging patterns of all types are possible including, but not limited to, solid areas, stripes, dots, squares, rectangles or any other shape possible within the limits of the application technology used. An important feature of the invention is the simultaneous inclusion, during the coating or application process, of logos, trade names, trademarks, part numbers, serial numbers, addresses, telephone, facsimile and e-mail numbers, and other commercial data and instructional markings as part of the coating process.

Polymeric coating 26 is selected to be appropriate for the intended end use. Various coatings 26 can be selected, including: aqueous or non-aqueous emulsions or solutions of latex, acrylics, polyvinylchloride (PVC), natural rubber, rubber compounds, plastisols or polyurethane. Other possible coatings 26 can include heat fusible plastics, two-part epoxies or other catalyzed polymeric coating systems. Coatings 26 may also have dielectric or electrically conductive properties depending upon end use. The materials for coatings 26 may be selected to have properties suitable for direct or indirect contact with food products, pharmaceutical products, potable water or health care products all of which may require Food and Drug Administration (FDA) or United States Department of Agriculture (USDA) usage acceptance. The presently preferred material for coating 26 is a liquid, vinyl plastisol which is particularly suitable for both the preferred screen printing process and the thermal fusion process.

The present invention is readily adaptable to various use applications including, but not limited to, dry powders sieving, solid/liquid separation, delumping, screening, dry powders sifting and filtering, including the separation of particulate matter from fluid streams of liquid and/or gas.

The present invention is appropriate for an infinite range of sizes and shapes within the scope of the particular manufacturing methodology used. When used with direct screen printing, indirect screen printing, indirect screen printing (heat transfer method), the invention allows for an unlimited number of patterns or shapes developed initially through graphics arts technology typical to the screen printing technology. Sizes for use with screen printing will range from approximately less than 0.5 inches square up to or greater than 70.0 inches overall in any dimension.

The invention is also appropriate for use on numerous mesh sections 22 for screen, sieve or filter substrates, including: woven polyester, woven nylon, woven carbonized (conductive) nylon, woven carbonized (conductive) polyester, woven polypropylene, woven polyethylene, woven stainless steel, copper or other metals, and woven meshes such as acrylic, PVC, PVDF and fluoroplastics. The invention also is appropriate for the mesh section 22 of non-woven screening, sieving and filtering and filtering substrates such as extruded meshes, felts, spun bonded papers, needled felted fabrics and other non-woven materials.

Further, the invention is particularly appropriate for use of numerous colors during the manufacturing process of coatings 26 which may be provided in virtually any color or colors. A particular color can be selected for a screen/sieve/filter edging 28 to indicate a particular feature thereof. Examples are: a particular color for polyester, nylon, stainless steel, etc.; a particular color for size identification, such as 15 inches, 18 inches, 24 inches, etc.; a particular color used as a trademark; and a particular color as an indicator of end use, for example, food contact versus non-food contact, and electrically conductive versus non-electrically conductive.

As is best shown in FIG. 5, a screen 20, formed in accordance with present invention, is shown mounted upon a conventional tubular metal ring 40 and help in place by a conventional clamping ring 42. The coating 26, and particularly edging 28, provide for superior slip resistance between ring 40 and clamp 42. Intermittent and incidental contact of the screen 20 with the metal ring 40 allows for electrical conductivity where conductive screens, or a conductive coating, are utilized for dissipation of static charges and the like.

It will be readily apparent to those skilled in this art that the disclosed inventive manufacturing methods, coating processes and resulting sieve/screen/filter products have been specifically illustrated and described herein, but it is to be understood that variations may be made thereto without departing from the spirit and scope of the invention as defined by the appended claimed subject matter.

I claim:

1. A sieve or filter screen, said screen comprising a foraminous section for separating material during a sieving or filtering operation and including a peripheral portion for providing a holding portion which can cooperate with means for holding said screen during use, said peripheral portion including a pattern comprising a discontinuous polymeric coating including identifying indicia thereon.

2. A screen as defined in claim 1 wherein said polymeric coating is applied to said screen by a screen printing process.

3. A screen as defined in claim 1 wherein said polymeric coating is comprised of a flexible, chemical resistant polymeric material selected from the group consisting of aqueous emulsions, non-aqueous emulsions, solutions of latex, acrylics, polyvinylchloride (PVC), natural rubber, rubber compounds, plastisols and polyurethane.

4. A screen as defined in claim 1 wherein said polymeric coating is applied in a discontinuous pattern to a marginal edging of said screen for protection from fraying of said screen.

5. A screen as defined in claim 1 wherein said polymeric coating is applied in a discontinuous pattern to a portion of said screen including said identifying indicia.

6. A screen as defined in claim 1 wherein said polymeric coating is applied in a discontinuous pattern to a portion of said screen including an electrical pathway through said screen.

7. A screen as defined in claim 1 wherein said polymeric coating is applied to said screen by a printing process and treated to become fused thereto.

8. A screen as defined in claim 1 wherein said polymeric coating is applied to said screen for providing distinguishable color codings.

9. A sieve or filter screen, said screen comprising a foraminous section for separating material during a sieving or filtering operation and including a peripheral portion for providing a holding portion which can cooperate with means for holding said screen during use, said peripheral portion comprising a slip resistant edging including a polymeric coating in a discontinuous pattern.

10. A screen as defined in claim 9 wherein said polymeric coating is applied to said screen by a screen printing process.

11. A screen as defined in claim 9 wherein said polymeric coating is comprised of a flexible, chemical resistant polymeric material selected from the group consisting of aqueous emulsions, non-aqueous emulsions, solutions of latex, acrylics, polyvinylchloride (PVC), natural rubber, rubber compounds, plastisols and polyurethane.

12. A screen as defined in claim 9 wherein said polymeric coating is applied in a discontinuous pattern to a portion of said screen including identifying indicia thereon.

13. A screen as defined in claim 9 wherein said polymeric coating is applied in a discontinuous pattern to a portion of said screen including an electrical pathway through said screen.

14. A screen as defined in claim 9 wherein said polymeric coating is applied to said screen by a printing process and treated to become fused thereto.

15. A screen as defined in claim 9 wherein said polymeric coating is applied to said screen including distinguishable color codings.

\* \* \* \* \*